United States Patent [19]

Wada et al.

[11] 4,291,949
[45] Sep. 29, 1981

[54] POSITIVE-TYPE DISPLAY DEVICE USING GUEST-HOST TYPE MIXTURE OF LIQUID CRYSTALS AND DYES

[75] Inventors: Masanobu Wada, No. 8-22 Kamisugi 5-chome, Sendai-shi, Miyagi-ken, Japan; Tatsuo Uchida, Sendai; Toru Teshima, Yokohama, both of Japan

[73] Assignees: Masanobu Wada, Sendai; Stanley Electric Co., Tokyo, both of Japan

[21] Appl. No.: 50,299

[22] Filed: Jun. 20, 1979

[30] Foreign Application Priority Data

Dec. 27, 1978 [JP] Japan ................................ 53-160147

[51] Int. Cl.$^3$ .................................................. G02F 1/133
[52] U.S. Cl. ............................................. 350/349; 350/340
[58] Field of Search ............................................ 350/349, 340

[56] References Cited

U.S. PATENT DOCUMENTS 3,864,022  2/1975  Moriyama et al. ................... 350/349
4,030,997  6/1977  Miller et al. ...................... 350/340 X

OTHER PUBLICATIONS

Chabiovsky et al., "Liquid-Crystal Cells with Special Electrodes for the Generation of Uniform Colors by Optical Birefringence", *IEEE Trans. on Electron Devices*, vol. ED-24, pp. 807-810, Jul., 1977.

*Primary Examiner*—Edward S. Bauer
*Attorney, Agent, or Firm*—Cushman, Darby & Cushman

[57] ABSTRACT

A positive-type display device improved in response time and in uniformity of display images is provided. This display device has a cell structure containing a mixture consisting of at least one of nematic liquid crystals having a nematic dielectric anisotropy and at least one of pleochroic dyes in a closed thin space formed by two substrates which are parallel to each other and a spacer which is provided between ends of said two substrates. Each of said two substrates has an electrode film adherently attached to its surface within said closed space, and an alignment film is formed on at least one of said electrode films. The surfaces of said films which are brought into contact with said mixture are subjected to a treatment for orientation of the molecules of said liquid crystals and said dyes in a direction substantially normal to the plane of the substrate when a voltage is not applied. Said positive-type display device is characterized in that the longitudinal axes of the molecules in said mixture contained in said space are inclined at an angle of 3° to 30° relative to the normal to said substrate in their quiescent state at no voltage.

2 Claims, 8 Drawing Figures

RELATIONSHIP OF RESPONSE TIME VS. VOLTAGE

- • $\theta = 5.1°$
- ○ $\theta = 9.3°$
- ■ $\theta = 3.4°/24.9°$
- □ $\theta = 15.5°$
- ▲ $\theta = 20.8°$
- △ $\theta = 30.5°$

RELATIONSHIP OF ABSORBANCE VS. VOLTAGE

RELATIONSHIP OF A/Ao VS. VOLTAGE

RELATIONSHIP OF Ao, A15 AND A15/Ao VS. INCLINATION ANGLE θ

RELATIONSHIP OF RESPONSE TIME VS. VOLTAGE

RELATIONSHIP OF TRANSMITTANCE VS. VIEWING ANGLE $\phi$ OF CELL WITH $\theta = 5.1°$

POSITIVE-TYPE DISPLAY DEVICE USING GUEST-HOST TYPE MIXTURE OF LIQUID CRYSTALS AND DYES

BACKGROUND OF THE INVENTION (a) Field of the Invention

The present invention relates to a display device using liquid crystals, and more particularly, it relates to a display device of a guest-host type using a mixture of nematic liquid crystals having a negative dielectric anisotropy and pleochroic dye.

(b) Description of the Prior Art

There have been proposed, heretofore, many display devices using a guest-host type combination of liquid crystals and pleochroic dyes, which devices in general comprise a cell structure having a mixture of at least one of nematic liquid crystals as host material and at least one of pleochroic dyes as guest material placed in a space between two parallel substrates, as disclosed in, for example, Japanese Patent Publication No. 47-3778 published Feb. 2, 1972.

Such conventional guest-host type display cells are of the so-called negative type, that is, they are colored when no voltage is applied, while they become faded out upon application of a voltage between the electrodes which are formed on the inside surfaces of the substrates. It has been found, however, that the positive-type display cells, i.e. those which are capable of effecting a colored display upon application of a voltage and being faded out when the voltage is removed, are more convenient to use. Although some positive-type display cells using the guest-host type combination of liquid crystals and dyes have been proposed heretofore also, they have many disadvantages. That is, in the cell structure of prior-art such device, the molecules of liquid crystals and dyes are rendered to a very mobile state in any directions immediately after a voltage is applied. Therefore, the molecules will move in random fashion in all directions, and subsequently they will gradually assume a stationary state, with the axes of all these molecules being not oriented in one direction. As a result, known positive-type display cells have a lower rate of response and have a tendency to effect a non-uniform or mottled display.

SUMMARY OF THE INVENTION

It is an object of the present invention to provide a positive-type display device having an enhanced rate of response and an ability of effecting a uniform display.

Another object of the present invention is to provide a cell structure which makes it possible for the molecules of liquid crystals and dyes to rotate their logitudinal axes jointly coincidentally in one direction when a voltage is applied.

DETAILED DESCRIPTION OF THE PREFERRED EMBODIMENT

It has been found that the above-stated objects can be achieved by providing a cell structure wherein the molecular axes of liquid crystals and dyes contained in the space between two parallel electrodes are inclined in their quiescent state under no voltage at an angle of 3° to 30° with respect to the normal to the electrodes, so that the molecules of liquid crystals and dyes are substantially limited in a direction of their movement when a voltage is applied.

The dyes which are used in the present invention are the so-called pleochroic dyes, i.e. those having a higher absorbance of light in a direction along the longitudinal axis of the molecule and a lower absorbance of light in the transverse direction. Many of such pleochroic dyes have been known in the art as described in, for example, "APPLIED PHYSICS LETTERS" Vol. 13, No. 3, p. 91. Many of the nematic liquid crystals having a negative dielectric anisotropy useful in the present invention are known also in the art as disclosed in, for example, "Journal Chemical Physics" Vol. 39, p. 384, (1963).

The display device using liquid crystals and dyes according to the present invention is generally prepared in the following way. Firstly, a pair of transparent susbstates, for example, thin glass substrates, are subjected to vacuum evaporation with electroconductive material, e.g. indium oxide, to form an electrode on one surface of each substate. Then, an alignment film which serves to orient the molecules of liquid crystals (host material) and dyes (guest material) in a selected direction upon application of a voltage is formed on the electrode by oblique deposition in vacuum. Thereafter, the alignment film is subjected to a treatment, by which the direction of orientation of the molecules of host and guest materials in their quiescent state under no voltage becomes substantially normal to the plane of the substrate. This treatment will be referred to hereinafter as "normally aligning treatment". In the present invention, therefore, the molecules of host and guest materials are oriented depending upon the alignment film which is formed by the oblique deposition and treated by the normally aligning treatment.

Figure 2:
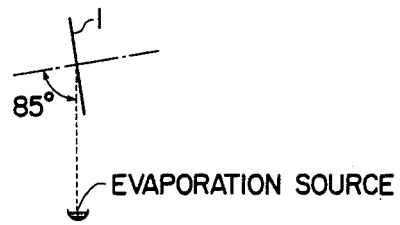
FIG. 2 is a diagrammatical sketch of a substrate and an evaporation source which are in a position for effecting oblique deposition, in vacuum, of an alignment film on the substrate, wherein evaporation angle is 85°.

The oblique deposition may be carried out by depositing in vacuum a film of alignment material such as SiO or $MgF_2$ on the electrode in an arrangement that the normal to the surface of the electrode film makes a selected angle to a vertical line between the substrate and a source containing the alignment material. This angle is referred to as "evaporation angle" in this specification. For example, the evaporation angle may be 85° as shown in FIG. 2. The normally aligning treatment may be carried out by dipping the transparent substrate having the electrode on which the alignment film is formed by oblique deposition, for example, in a solution of dichlorodimethylsilane (DMS) in toluene or in an aqueous solution of N, N-dimethyl-N-octadecyl-3-aminopropyltrimetroxysilyl chloride (DMOAP) for a few minutes. Techniques for such oblique deposition and normally aligning treatment have been well known in the art.

The alignment film may be formed on one or both of two transparent electrodes which are disposed facing each other in a display cell. The normally aligning treatment, however, must be applied to each of the two transparent electrodes.

Figure 1:
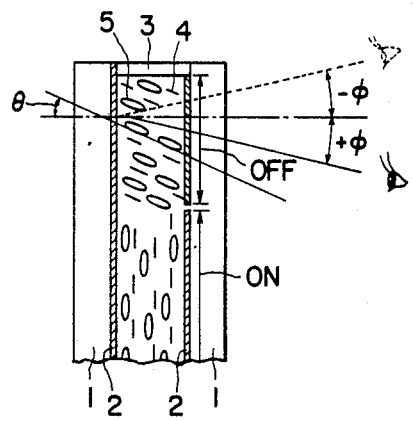
FIG. 1 is a diagrammatical cross-sectional view of an embodiment of a positive-type display device according to the present invention.

Referring now to FIG. 1, two transparent substrates 1 prepared according to the above procedure are disposed parallel to each other, spacing a distance of about 10 to 20 μm between the facing surfaces of the substrates and in a manner that the transparent electrode 2 formed on one substrate is opposed to that on the other substrate. A mixture of pleochroic dye 5 and nematic liquid crystal 4 is placed in the space between the electrodes and sealed with a spacer 3. In case both electrodes have an alignment film applied thereon by oblique deposition, they are disposed in a manner that the growth direction of the alignment film on one electrode is exactly opposite to that on the other electrode due to the rotation of one substrate by 180° relative to the other substrate. FIG. 1 shows a diagrammatic partial cross-sectional view of a display device arranged in this way. In FIG. 1, the alignment film growth on one substrate is pointing upwardly, while that on the other substrate is pointing downwardly.

Figure 3:
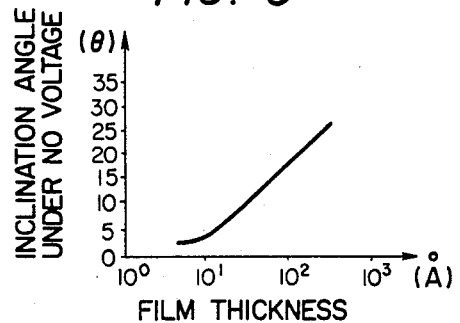
FIG. 3 is a chart showing the dependency of inclination angles $\theta$ of the molecular axes of liquid crystals and dyes upon the thickness of the alignment film when no voltage is applied.

When no voltage is applied, the host and guest materials are in their quiescent state with molecular axes thereof being at an angle of $\theta$ to the normal to the substrate, as shown in the upper half region denoted by "off" in FIG. 1. The magnitude $\theta$ is determined by a thickness of the alignment film formed by oblique deposition which is conducted at a given evaporation angle. The relationship between $\theta$ and the thickness of the film is shown in FIG. 3.

The angle $\theta$ is selected depending upon a voltage to be used, and, in general, it is in the range of 3° to 30°. When a lower voltage is used with I.C. to operate a display device, for example, a voltage of about 5 to 15 V is used, an angle of 5° to 9° is preferred, because there is substantially no delay in response as will be apparent from the results shown in FIG. 7. In case a voltage above 15 V is applied, the angle $\theta$ should be in the range of about 10° to 30°, preferably 10° to 20°.

The upper limit of 30° is required for enhancing a display contrast. Although a display of images may be achieved even when $\theta$ is above 30°, the front area of the display cell will appear with the color of pleochroic dye when a voltage is not applied. As a result, the color of images displayed upon application of a voltage will become less discernible from the color of the front area under no voltage.

In case both of the two substrates have an alignment film formed thereon by oblique deposition under a given condition and in case they are disposed in a cell exactly opposing to each other in growth direction of the film, an inclination angle $\theta$ of molecular axes is determined depending upon a thickness of the alignment film and/or evaporation angle. If there is a difference in evaporation condition between the alignment film on one substrate and that on the other substrate, the inclination angle of the molecular axes in the display device using the both substrates will be almost equal to an arithmetic mean of the numerical values of the inclination angles obtained in two display devices, one of which uses one of the substates and the other of which uses the other substrate.

According to the cell structure as described above, host and guest materials are in their quiescent state under no voltage, with the molecular axes thereof being not parallel but inclined at an angle $\theta$ relative to the normal to the substrate. When voltage is applied, therefore, the molecules of host and guest materials move, i.e. rotate, in the same direction. As a result of this conformity in rotational direction of the material molecules, a higher rate of response can be achieved. Moreover, a more uniform and non-mottled image can be displayed, because the molecules will suspend their movement under an applied voltage, with the molecular axes all being parallel to the plane of the substrate and without any disturbance in orientation of the molecules.

EXAMPLE

A mixture of liquid crystals consisting of 50% by weight of methoxy-benzylidene-p-n-butylaniline (MBBA) and 50% by weight of ethoxy-benzylidene-p-n-butylaniline is used as host material. A mixture of 100 parts by weight of the above liquid crystal mixture and 0.3 part by weight of a guest material, NK 2233 (merocyanic dye) available from Nippon Kanko Shikiso Kenkyujo Inc. is placed in a space between two substrates.

The substrate for effecting orientation of molecules has an alignment film of SiO applied by oblique deposition in vacuum and then subjected to the normally aligning treatment using N, N-dimethyl-N-octadecyl-3-amino propyltrimethoxy silylchloride (DMOAP). An inclination angle $\theta$ of the molecular axes of the liquid crystal and dye materials to the normal to the substrate is varied with variation in thickness of the alignment film. A series of display cells each having an alignment film on one of two substrates are produced. By controlling a thickness of the alignment film, the inclination angle of the molecules in these cells is adjusted to 5.1°, 9.3°, 15.5°, 20.8° and 30.5°. In addition, there is prepared a display cell using one substrate having such thickness of an alignment film as will produce an inclination angle of 3.4°, and another substrate having that of 24.9°. These two substrates are disposed, with the growth direction of the alignment film on one substrate being exactly opposite, i.e. at an angle of 180°, to that on the other substrate. This display cell will be designated hereinafter as "the cell with $\theta = 3.4°/24.9°$". The aforementioned oblique deposition of the alignment film of SiO is carried out in the same arrangement of the substrate and an evaporation source, as shown in FIG. 2. A layer of mixture of host and guest materials has a thickness of about 13 μm in all of the cells prepared in the above-stated procedures.

An electric field to be applied to the display cells is of 1 kHz square wave which does not cause dynamic scattering of the molecules of liquid crystals. Light rays used in this experiment have a wave length of about 607 nm, because all the cells exhibit a maximum light absorption at 607 nm. such rays can be produced by analyzing white rays through a monochromator. Linear polarized light rays having the plane of polarization parallel to the direction of the alignment film growth are used as incident light rays. The results of the experiment will be described hereunder.

Figure 4:
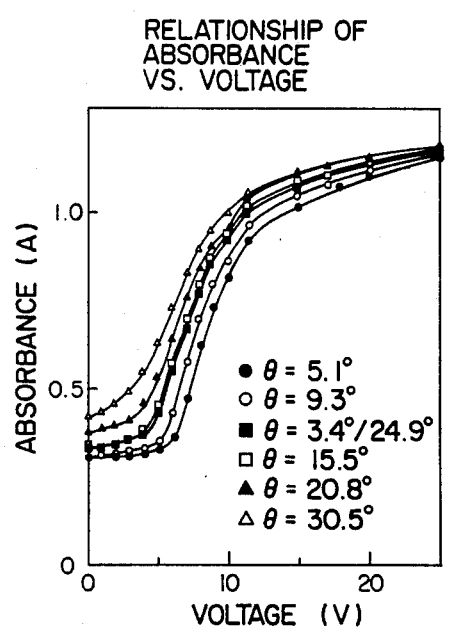
FIG. 4 is a chart showing the dependency of applied voltage upon the absorbance of a cell with varying inclination angles.

At first, the dependency of absorbance upon voltage of the cells is shown in FIG. 4. It has been found from the results shown in FIG. 4 that the relation between the inclination angle $\theta$ and display properties are as follows:

(i) As $\theta$ is increased, absorbance $A_0$ when no voltage is applied (hereinafter referred to as "in the "off" state") increases, that is, the display cell has a less tendency to decoloration when a voltage is removed.

(ii) As $\theta$ is increased, the threshold of voltage decreases and becomes obscure.

This threshold of voltage means a voltage when transmissivity varies by 10% based on its initial value. Absorbance is measured by means of a spectrophotometer.

Figure 5:
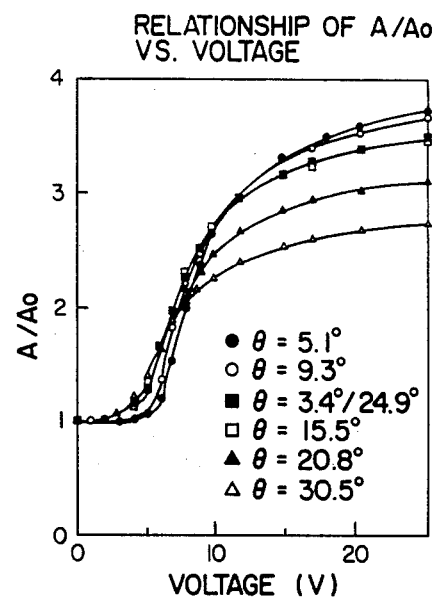
FIG. 5 is a chart showing the dependency of applied voltage upon the normalized absorbance with varying inclination angles.
Figure 6:
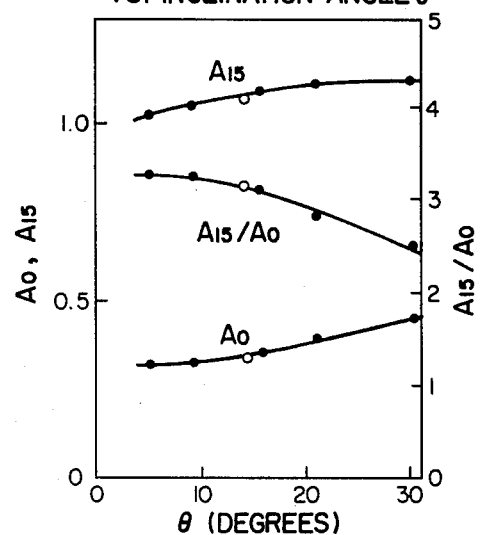
FIG. 6 is a chart showing the relationship of absorbance vs. inclination angle when an applied voltage is zero and 15 V, and the relationship of normalized absorbance vs. inclination angle when a voltage of 15 V is applied.

FIG. 5 shows a practical dichroic ratio obtained by normalizing, i.e. dividing an absorbance at a voltage A by the absorbance in the "off" state $A_0$, as shown in FIG. 4. It has been found from FIG. 5 that the dichroic ratio in a region of sufficiently higher voltage than the threshold decreases with an increase in $\theta$. FIG. 6 shows dependencies of absorbance in the "off" state $A_0$, absorbance at a voltage of 15 V ($A_{15}$) and dichroic ratio of $A_{15}/A_0$, upon an inclination angle $\theta$. From this Figure, it may be noted that the $A_{15}/A_0$ progressively markedly decreases at an inclination angle above 10°, though it does not significantly change in the region of 0° to 10°. The cell with $\theta = 3.4°/24.9°$ may be regarded as a cell having an inclination angle $\theta$ of $(3.4° + 24.9°)/2 \approx 14.2°$ as can be seen from curves plotted with white circles.

Figure 7:
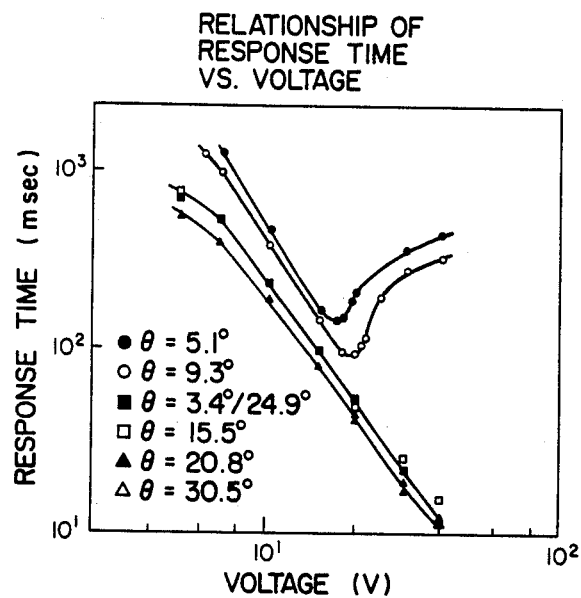
FIG. 7 is a chart showing the relationship between the applied voltage and the response time when varing inclination angles.

FIG. 7 shows the dependency of response time upon voltage. The response time is defined by the time period elapsed from the time when voltage is applied until the transmissivity at the wave length where a maximum absorption occurs reaches 10% of the initial transmissivity. This transmissivity changes from its initial value of 100% to its ultimate one of 0% at a voltage. As seen from this Figure, the phenomenon of an increase in response time will be observed in the cells with $\theta = 5.1°$ and $\theta = 9.3°$ when a voltage above 20 V is applied. This phenomenon may be attributed to the fact that the orientation of the molecules is transiently disturbed, resulting in random orientation immediately after a voltage is applied, and then the molecules are gradually oriented in one direction. In cells where $\theta$ is about 15°, such phenomenon cannot be observed. It should be noted, therefore, that a higher inclination angle $\theta$ must be selected when a shorter response time at a higher voltage is required.

With regard to the relationship between $\theta$ and response time, if only one of two substrates to be used in a cell has an alignment film formed by oblique deposition, an inclination angle determined by the film thickness should be taken into consideration. If both substrates have an alignment film, an arithmetic mean of an inclination angle determined by one substrate and that by the other substrate can be regarded as a sole inclination angle characteristic of the cell using both substrates.

Figure 8:
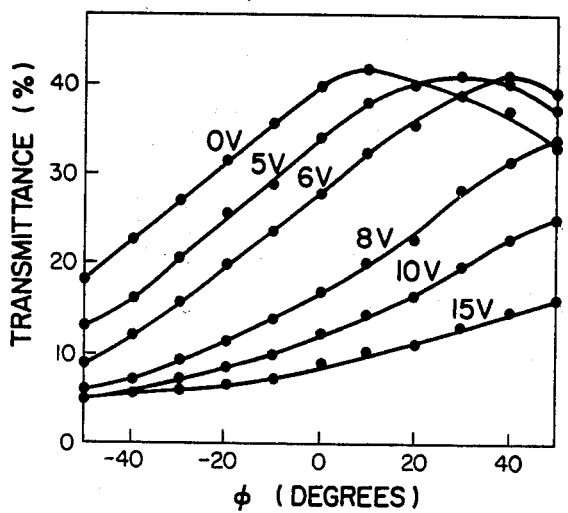
FIG. 8 is a chart showing the relationship of the transmittance vs. an angle between the normal to the substrate and the direction in which one views the front place of the cell with variation in voltage when an inclination angle is 5.1°.

In case the molecules are already obliquely oriented relative to the normal to the plane of the substrate when a voltage is not applied, it may be expected that the display property of the cell varies depending upon a direction in which one observes the front area of the display cell. This problem is analyzed hereunder. FIG. 8 shows the dependency of the transmittance at a wavelength where a maximum absorption occurs, upon the angle $\phi$ with variation in voltage for the cell with $\theta = 5.1°$. This angle $\phi$ is an angle defined between the normal to the substrate and the direction of observation. As shown in FIG. 1, the angle $\phi$ is positive in case the direction of observation is rotated clockwise starting from the normal to the substrate, whereas it is negative in case the direction of observation is rotated counterclockwise. It can be noted from the curves shown in FIG. 8 that a maximum transmittance in the "off" state is obtained at an angle $\phi$ of $+10°$, and also that the angle $\phi_{max}$ corresponding to a maximum transmittance increases with voltage. Similar experiments conducted with other cells having an inclination angle other than 5.1° show that, as $\theta$ increases, the $\phi_{max}$ in the "off" state increases also; in other words, an angle between the normal to the substrate and a direction for exhibiting maximum absorption increases. Therefore, when display devices are produced, the magnitude $\theta$ and the direction of orientation of the liquid crystal molecules should be selected primarily by taking into account a direction in which one views the front area of the display cell.

What is claimed is:

1. A positive-type display device comprising:
    two substrates disposed in substantially parallel relationship to each other with a spacer provided between the ends of said two substrates to form a closed space;
    an electrode film within said closed space adherently attached to the surface of each of said two substrates;
    an alignment film formed on at least one of said electrode films; and
    a mixture consisting essentially of at least one nematic liquid crystal having a negative dielectric anisotropy and at least one pleochroic dye, said mixture retained within said closed space,
    wherein the surfaces of said electrode film and said alignment film in contact with said mixture have been treated to orient the longitudinal axes of the molecules contained in said mixture at an angle greater than 10° up to 30° relative to normal of the plane of said substrate when said molecules are in their quiescent state with no applied voltage.

2. A positive-type display cell according to claim 1, wherein said angle is in the range of greater than 10° up to 20°, and a voltage applied between said electrodes is greater than 15 V.

* * * * *